(12) United States Patent
Lewis

(10) Patent No.: US 10,718,555 B2
(45) Date of Patent: Jul. 21, 2020

(54) INLINE ACID DETECTION APPARATUS FOR INHIBITION IN AN HVAC SYSTEM

(71) Applicant: Billy Lewis, Bristol, TN (US)

(72) Inventor: Billy Lewis, Bristol, TN (US)

(*) Notice: Subject to any disclaimer, the term of this patent is extended or adjusted under 35 U.S.C. 154(b) by 133 days.

(21) Appl. No.: 16/158,264

(22) Filed: Oct. 11, 2018

(65) Prior Publication Data

US 2020/0116401 A1     Apr. 16, 2020

(51) Int. Cl.
*F25B 49/00* (2006.01)
*F25B 41/00* (2006.01)
*G01N 31/22* (2006.01)

(52) U.S. Cl.
CPC .......... *F25B 41/006* (2013.01); *F25B 49/005* (2013.01); *G01N 31/221* (2013.01)

(58) Field of Classification Search
CPC .... F25B 49/005; F25B 49/02; F25B 2500/06; F25B 2500/14; G01N 17/04; G01N 31/221; Y10T 137/8359
See application file for complete search history.

(56) References Cited

U.S. PATENT DOCUMENTS

| 3,122,001 | A | * | 2/1964 | Pritchett | ................. F25B 31/02 62/126 |
| 5,127,433 | A | * | 7/1992 | Argyle | ................... G01N 17/00 116/206 |
| 5,377,496 | A | | 1/1995 | Otto | |
| 8,779,362 | B1 | | 7/2014 | Amundsen | |

* cited by examiner

*Primary Examiner* — Jonathan Bradford
(74) *Attorney, Agent, or Firm* — Kenneth C. Spafford

(57) ABSTRACT

An inline acid detection apparatus for inhibition in an HVAC system including at least one line adapter, at least one passage adapter, and an inhibitor. The at least one line adapter is configured to mate with a refrigerant line on the HVAC system. The at least one passage adapter configured to couple to the second-diameter of the at least one line adapter. The at least one passage adapter allowing a process fluid to flow therethrough. The inhibitor is configured to stop the process fluid from passing through the inline acid detection apparatus. The inhibitor is actuated by a trigger mechanism. The trigger mechanism is configured to be actuated by an acid. The inline acid detection apparatus will shut down the HVAC system when the process fluid includes a threshold of the acid such that the trigger mechanism actuates the inhibitor.

18 Claims, 5 Drawing Sheets

INLINE ACID DETECTION APPARATUS FOR INHIBITION IN AN HVAC SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. FIELD OF THE INVENTION

The present invention relates generally to the field of HVAC units and more specifically relates to a detector for an HVAC unit.

2. DESCRIPTION OF RELATED ART

When moisture is present in an HVAC unit, the unit is vulnerable to internal acid formation. This creates harmful conditions for technicians who are exposed to this acid build-up. In addition, the acid creates pinholes in the evaporator, which can cause Freon to leak out. This can result in both acid and Freon flowing into the environment. An effective alternative is needed.

U.S. Pat. No. 5,377,496 to Nancy M. Otto relates to a refrigeration system with installed acid contamination indicator. The described refrigeration system with installed acid contamination indicator includes an improved vapor compression refrigeration system that has an indicator for detecting the presence of acid contamination in the refrigerant contained in the system. The indicator is permanently or semipermanently installed so that continuous monitoring of the refrigerant for acid is possible. The indicator is located in a portion of the system where the refrigerant is always in a gaseous state. In a preferred embodiment, the indicator is located in a bypass line between the suction and the discharge of the system compressor. The indicator preferably shows the presence of acid by a color change, visible from a point external to the indicator, in an indicator bed in the indicator. The color change may be either permanent or the indicator bed may return to its original color when the acid contamination is no longer present in the refrigerant.

BRIEF SUMMARY OF THE INVENTION

In view of the foregoing disadvantages inherent in the known HVAC unit art, the present disclosure provides a novel inline acid detection apparatus for inhibition in an HVAC system. The general purpose of the present disclosure, which will be described subsequently in greater detail, is to provide an effective inline acid detection apparatus for inhibition in an HVAC system.

An inline acid detection apparatus for inhibition in an HVAC system is disclosed herein. The inline acid detection apparatus for inhibition in an HVAC system includes at least one line adapter, at least one passage adapter, and an inhibitor. The at least one line adapter is configured to mate with a refrigerant line on the HVAC system. The at least one line adapter has a first-diameter and a second-diameter. The at least one passage adapter is configured to couple to the second-diameter of the at least one line adapter. The at least one passage adapter allows a process fluid to flow therethrough. The inhibitor is configured to stop the process fluid from passing through the inline acid detection apparatus; the inhibitor is actuated by a trigger mechanism. The trigger mechanism is configured to be actuated by the presence of an acid. The inline acid detection apparatus shuts down the HVAC system when the process fluid includes a threshold of the acid such that the trigger mechanism actuates the inhibitor. The apparatus includes Freon safe material. The Freon flow moves through the apparatus without restriction.

According to another embodiment, a method of using an inline acid detection apparatus is also disclosed herein. The method of using an inline acid detection apparatus includes providing an inline acid detection apparatus; attaching the inline acid detection apparatus to the refrigerant line in series to a compressor unit; running an HVAC unit until the trigger mechanism causes the inhibitor to inhibit a process fluid flow through the inline acid detector apparatus; and replacing a reaction-plate of the trigger mechanism.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an inline acid detection apparatus for inhibition in an HVAC system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to HVAC units and more particularly to an inline acid detection apparatus for inhibition in an HVAC system as used to improve the detection of acid in HVAC units and promote longevity of such units.

Generally, the inline acid detection apparatus for inhibition in an HVAC system provides a device for HVAC units to detect internal acidic formation. This makes it safer for HVAC technicians to work on units by reducing the risk of hazardous exposure. It operates in the Freon flow line and cuts power to the HVAC unit when dangerous levels of acid are detected. This further prevents Freon and acid from leaking into the environment. The present invention assists in preventing premature destruction/compromise of an HVAC unit.

The inline acid detection apparatus for inhibition in an HVAC system is a device designed to trip when exposed to acid in order to cut power to an HVAC unit. The device may comprise a plurality of copper tubes having a sensory apparatus and control unit for detecting the presence of harmful conditions including unsafe acid buildup in an HVAC unit. The copper tubing may include flared end pieces, a compression spring, and a stainless-steel coupling connected to a plunger mechanism. Upon detection of unsafe conditions by the sensory apparatus, the control unit may trigger a signal for disabling the compressor and other parts in the HVAC unit. The present invention may be used in refrigeration systems as well as the HVAC/HVAC-R Industry.

Figure 1:
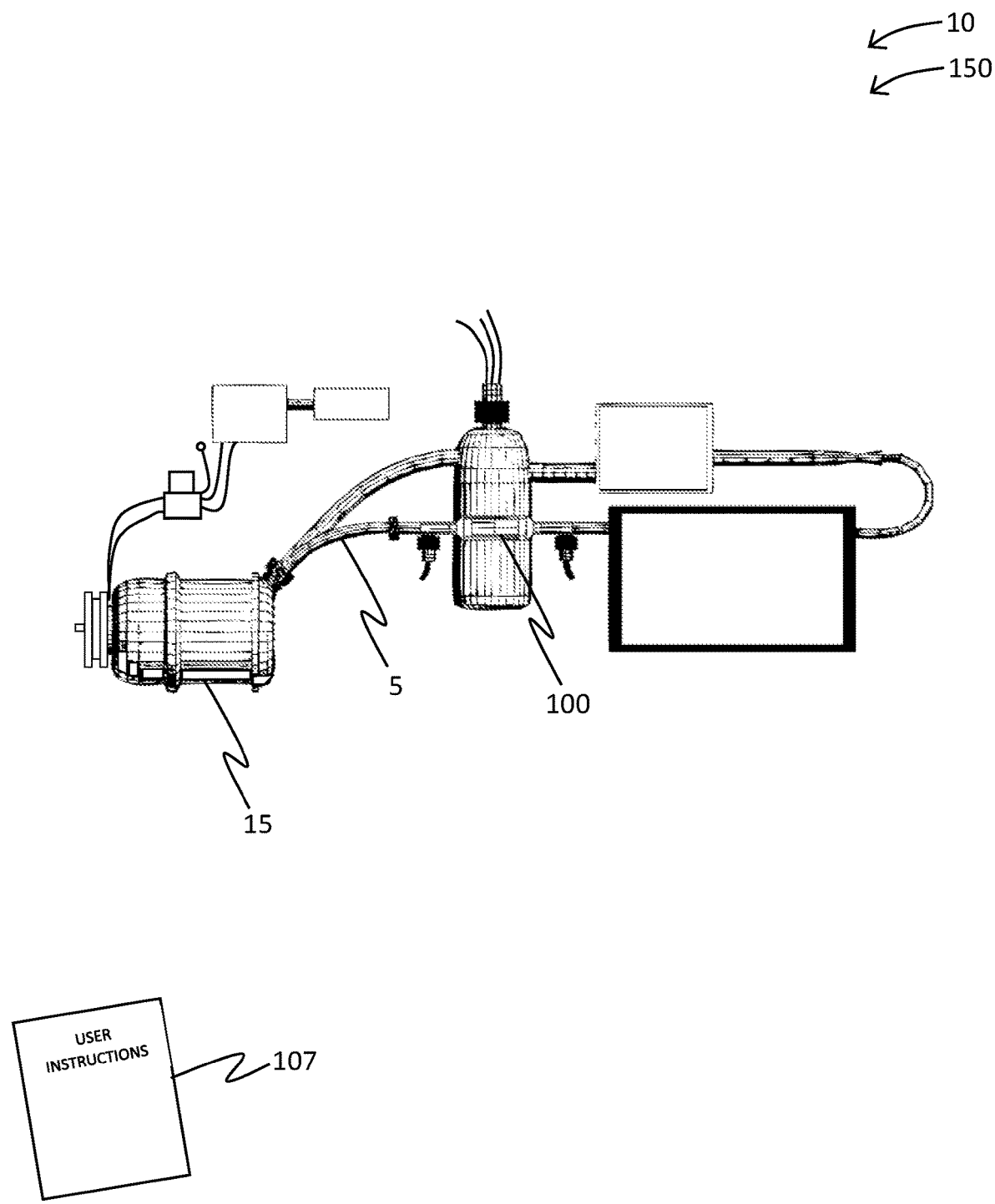
FIG. 1 is a perspective view of the inline acid detection apparatus for inhibition in an HVAC system during an 'in-use' condition, according to an embodiment of the disclosure.

Referring now more specifically to the drawings by numerals of reference, there is shown in FIGS. 1-5, various views of an inline acid detection apparatus for inhibition in an HVAC system 100. FIG. 1 shows an inline acid detection apparatus for inhibition in an HVAC system 100 during an 'in-use' condition 150, according to an embodiment of the present disclosure. As illustrated, the inline acid detection apparatus for inhibition in an HVAC system 100 may include at least one line adapter 110, at least one passage adapter 120, and an inhibitor 130. The at least one line adapter 110 is configured to mate with a refrigerant line 5 on the HVAC system 10. The at least one line adapter 110 includes a first-diameter 112 and a second-diameter 114. The at least one passage adapter 120 is configured to couple to the second-diameter 114 of the at least one line adapter 110. The at least one passage adapter 120 allowing a process fluid to flow therethrough. The inhibitor is configured to stop the process fluid from passing through the inline acid detection apparatus 100. The inhibitor 130 actuated by a trigger mechanism 140. The trigger mechanism 140 is configured to be actuated by an acid. The inline acid detection apparatus 100 will shut down the HVAC system 10 when the process fluid includes a threshold of the acid such that the trigger mechanism 140 actuates the inhibitor 130.

Figure 2:
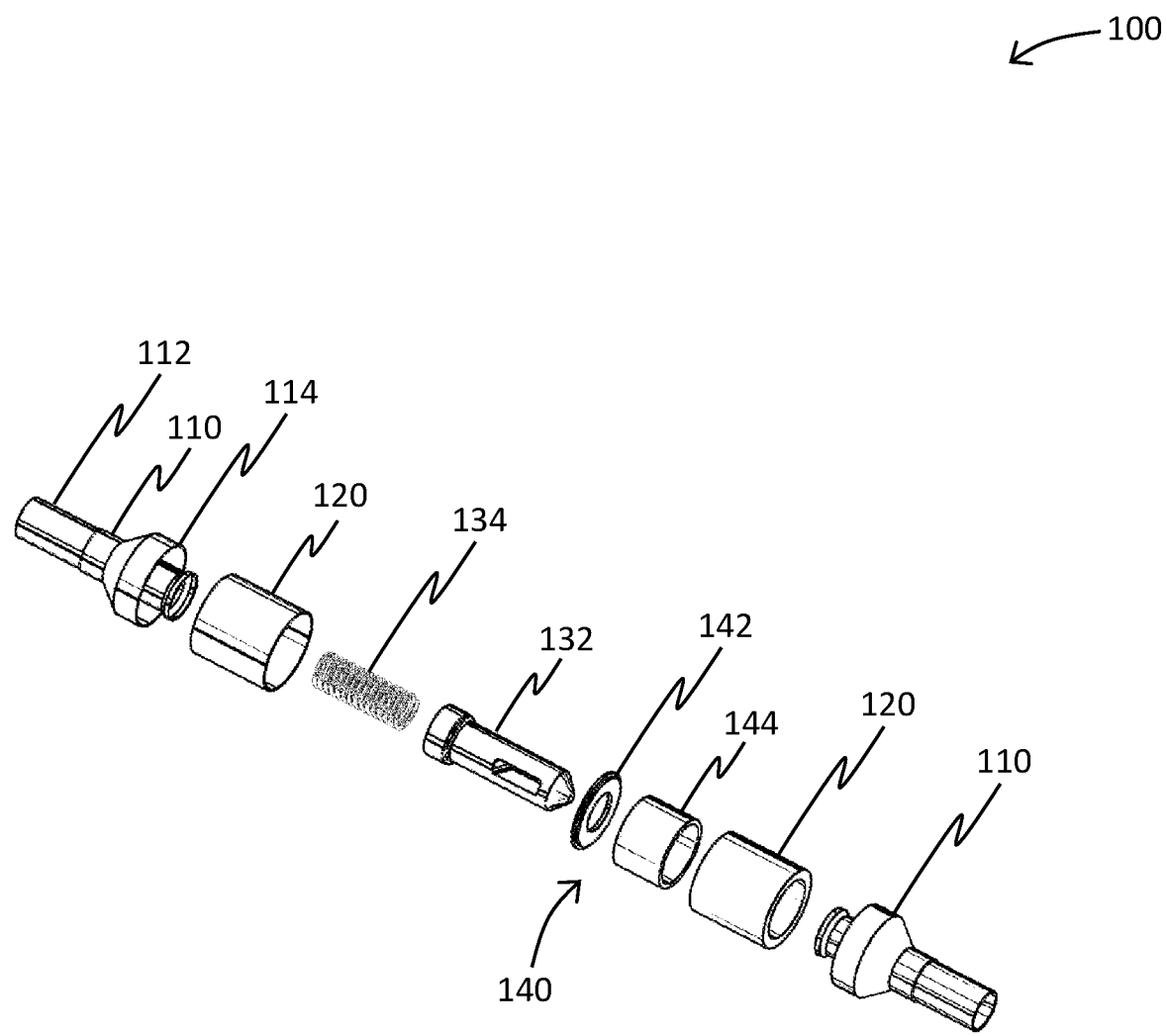
FIG. 2 is an exploded view of the inline acid detection apparatus for inhibition in an HVAC system of FIG. 1, according to an embodiment of the present disclosure.

FIG. 2 shows an exploded view of the inline acid detection apparatus for inhibition in an HVAC system 100 of FIG. 1, according to an embodiment of the present disclosure. As above, the inline acid detection apparatus for inhibition in an HVAC system 100 may include the at least one line adapter 110, the at least one passage adapter 120, and the inhibitor 130. The inhibitor 130 includes a plunger 132. The plunger 132 is configured to close off the first-diameter 112 of the at least one line adapter 110. The inhibitor 130 includes a spring 134 configured to push the plunger 132. The trigger mechanism 140 includes a reaction-plate 142 which is configured to react to the acid. The reaction-plate 142 is 6061 Aluminum in order for acid to activate the apparatus. The trigger mechanism 140 further includes a plate-support 144; the plate-support 144 is configured to retain the reaction-plate 142 in a static position.

Figure 3:
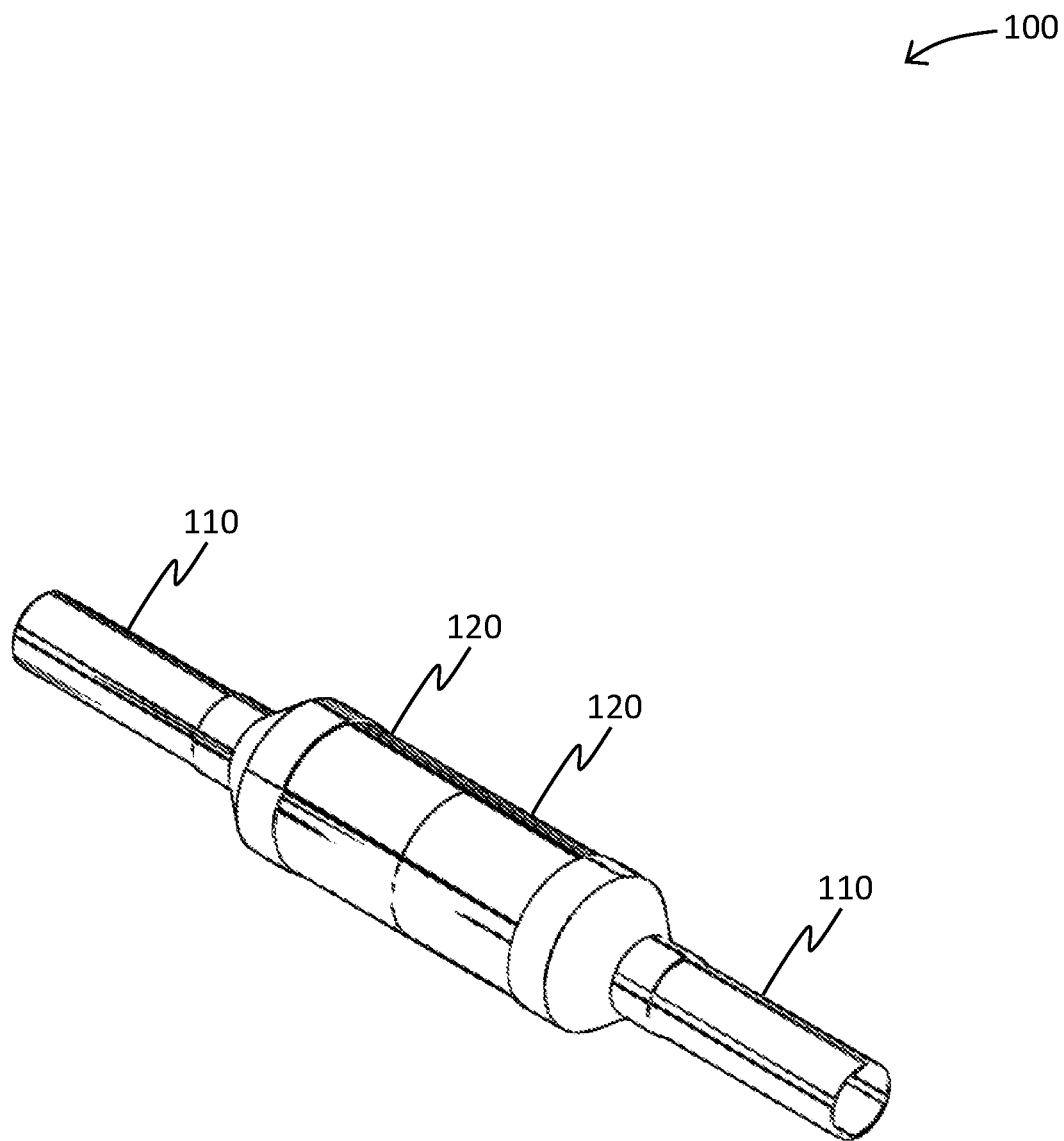
FIG. 3 is a perspective view of the inline acid detection apparatus for inhibition in an HVAC system of FIG. 1, according to an embodiment of the present disclosure.

Referring now to FIG. 3 showing a perspective view of the inline acid detection apparatus for inhibition in an HVAC system 100 of FIG. 1, according to an embodiment of the present disclosure. As above, the inline acid detection apparatus for inhibition in an HVAC system 100 may include the at least one line adapter 110, the at least one passage adapter 120, and the inhibitor 130 configured to shut down the HVAC system 10 when the process fluid includes a threshold of the acid such that the trigger mechanism 140 actuates the inhibitor 130. In a preferred embodiment, the reaction-plate 142 comprises of 6061 Aluminum material and the at least one line adapter comprises copper. The at least one passage-adapter 110 may comprise copper, stainless steel, or other suitable materials. The inhibitor 130 is nested inside of the at least one passage adapter 110.

Figure 4:
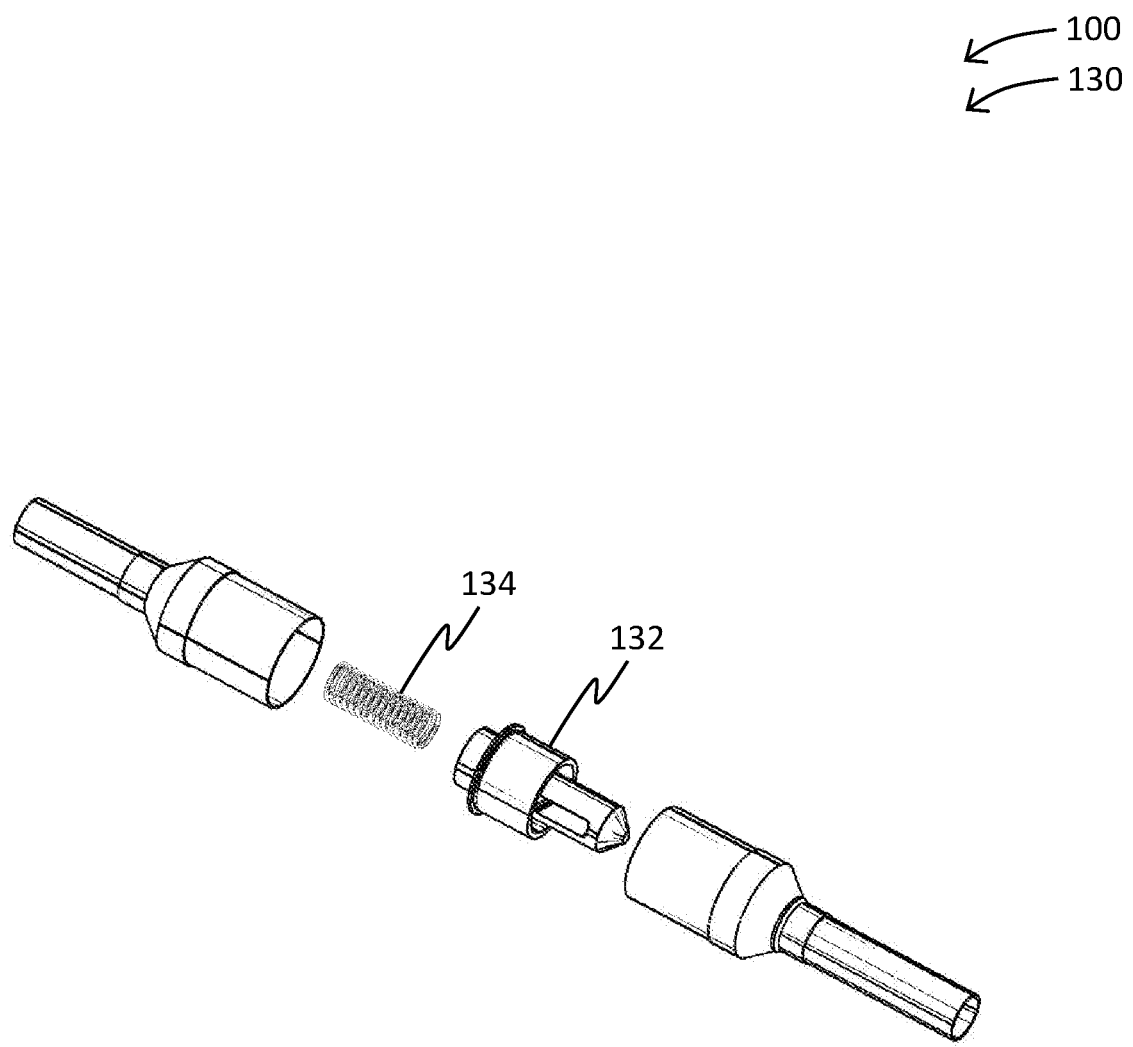
FIG. 4 is an exploded view of the inline acid detection apparatus for inhibition in an HVAC system of FIG. 1, according to an embodiment of the present disclosure.

FIG. 4 shows an exploded view of the inline acid detection apparatus for inhibition in an HVAC system 100 of FIG. 1, according to an embodiment of the present disclosure. As above, the inline acid detection apparatus for inhibition in an HVAC system 100 may include the at least one line adapter 110, the at least one passage adapter 120, and the inhibitor 130. A plurality of the at least one passage adapter 120 are configured to connect in series. The second-diameter 114 is larger that the first-diameter 112. The spring 134 is configured to abut with the first-diameter 112 of the at least one line adapter 110. The reaction-plate 142 is configured to dissolve in inorganic acids or organic acids. The reaction-plate 142 is configured to be replaced in the inline acid detection apparatus 100 when the reaction-plate 142 has reacted with the acid.

According to one embodiment, the inline acid detection apparatus for inhibition in an HVAC system 100 may be arranged as a kit. In particular, the inline acid detection apparatus for inhibition in an HVAC system 100 may further include a set of instructions 107. The instructions 107 may detail functional relationships in relation to the structure of the inline acid detection apparatus for inhibition in an HVAC system 100 such that the inline acid detection apparatus for inhibition in an HVAC system 100 can be used, maintained, or the like, in a preferred manner.

Figure 5:
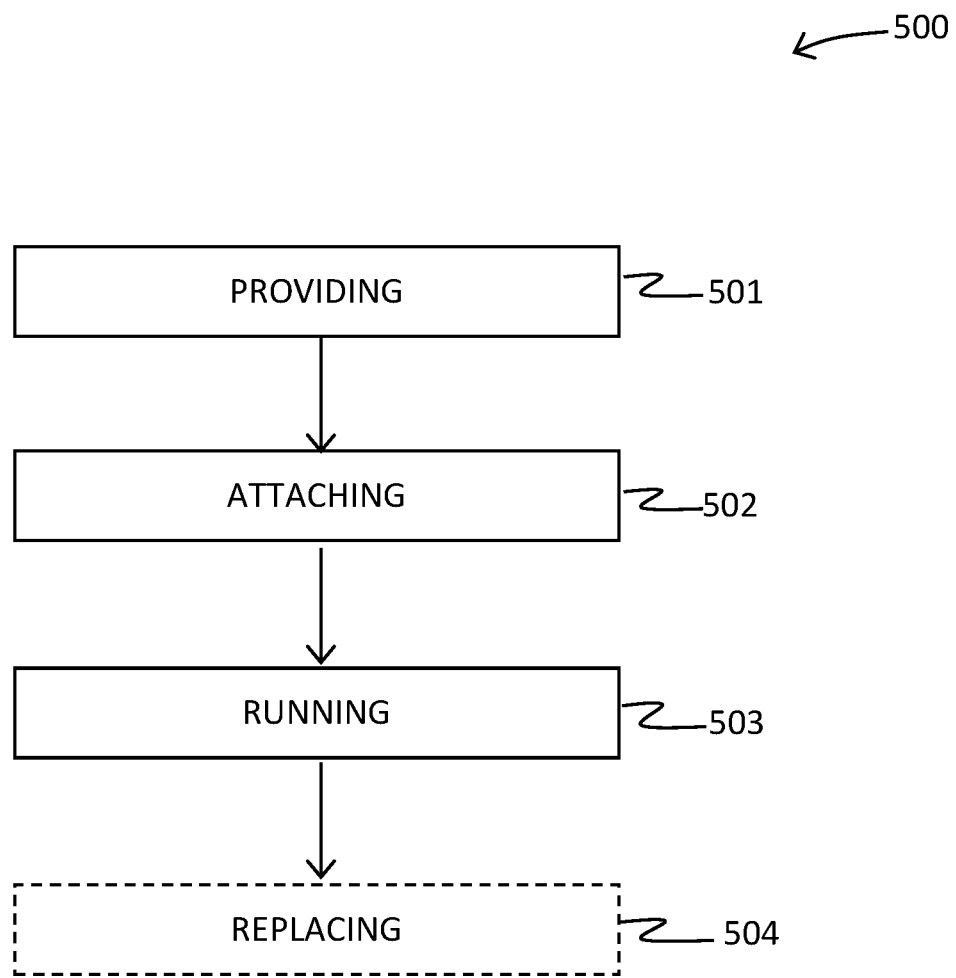
FIG. 5 is a flow diagram illustrating a method of use for the inline acid detection apparatus for inhibition in an HVAC system, according to an embodiment of the present disclosure.

FIG. 5 is a flow diagram illustrating a method of using an inline acid detection apparatus 500, according to an embodiment of the present disclosure. In particular, the method for method of using an inline acid detection apparatus 500 may include one or more components or features of the inline acid detection apparatus for inhibition in an HVAC system 100 as described above. As illustrated, the method of using an inline acid detection apparatus 500 may include the steps of: step one 501, providing an inline acid detection apparatus 100; step two 502, attaching the inline acid detection apparatus 100 to the refrigerant line 5 in series to a compressor unit 15; step three 503, running an HVAC unit 10 until the trigger mechanism 140 causes the inhibitor 130 to inhibit a process fluid flow through the inline acid detector apparatus 100; and step four 504, replacing a reaction-plate 142 of the trigger mechanism 140.

It should be noted that step four 504 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other method of using an inline acid detection apparatus, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An inline acid detection apparatus for inhibition in an HVAC system, the apparatus comprising:
   at least one line adapter, said at least one line adapter configured to mate with a refrigerant line on said HVAC system, said at least one line adapter having a first-diameter and a second-diameter;
   at least one passage adapter, said at least one passage adapter configured to couple to said second-diameter of said at least one line adapter, said at least one passage adapter allowing a process fluid to flow therethrough;
   an inhibitor, said inhibitor configured to stop said process fluid from passing through said inline acid detection apparatus, said inhibitor actuated by a trigger mechanism, said trigger mechanism is configured to be actuated by an acid, said inhibitor including a plunger which is configured to close off said first-diameter of said at least one line adapter; and
   wherein said inline acid detection apparatus is configured to prevent circulation of said process fluid within said HVAC system by impeding flow of said process fluid through said passage adapter with said inhibitor when said process fluid includes a threshold of said acid such that said trigger mechanism actuates said inhibitor.

2. The apparatus of claim 1, wherein said inhibitor includes a spring, said spring is configured to push said plunger.

3. The apparatus of claim 1, wherein said trigger mechanism includes a reaction-plate, said reaction-plate is configured to react to said acid.

4. The apparatus of claim 3, wherein said trigger mechanism further includes a plate-support, said plate-support is configured to retain said reaction-plate in a static position.

5. The apparatus of claim 3, wherein said reaction-plate comprises of 6061 Aluminum material.

6. The apparatus of claim 1, wherein said at least one line adapter comprises copper.

7. The apparatus of claim 1, wherein said second-diameter is larger that said first-diameter.

8. The apparatus of claim 1, wherein said at least one passage-adapter comprises copper.

9. The apparatus of claim 2, wherein said at least one passage-adapter comprises stainless steel.

10. The apparatus of claim 1, wherein a plurality of said at least one passage adapter are configured to connect in series.

11. The apparatus of claim 2, wherein said spring is configured to abut with said first-diameter of said at least one line adapter.

12. The apparatus of claim 3, wherein said reaction-plate is configured to dissolve in inorganic acids.

13. The apparatus of claim 3, wherein said reaction-plate is configured to dissolve in organic acids.

14. The apparatus of claim 3, wherein said reaction-plate is configured to be replaced in said inline acid detection apparatus when said reaction-plate has reacted with said acid.

15. The apparatus of claim 1, wherein said inhibitor is nested inside of said at least one passage adapter.

16. An inline acid detection apparatus for inhibition in an HVAC system, the apparatus comprising:
   at least one line adapter, said at least one line adapter configured to mate with a refrigerant line on said HVAC system, said at least one line adapter having a first-diameter and a second-diameter;
   at least one passage adapter, said at least one passage adapter configured to couple to said second-diameter of said at least one line adapter, said at least one passage adapter allowing a process fluid to flow therethrough;
   an inhibitor, said inhibitor configured to stop said process fluid from passing through said inline acid detection apparatus, said inhibitor actuated by a trigger mechanism, said trigger mechanism is configured to be actuated by an acid, said inhibitor including a plunger which is configured to close off said first-diameter of said at least one line adapter;
   wherein said inline acid detection apparatus is configured to prevent circulation of said process fluid within said HVAC system by impeding flow of said process fluid through said passage adapter with said inhibitor when said process fluid includes a threshold of said acid such that said trigger mechanism actuates said inhibitor;
   wherein said inhibitor includes a plunger, said plunger is configured to close off said first-diameter of said at least one line adapter;
   wherein said inhibitor includes a spring, said spring is configured to push said plunger;
   wherein said trigger mechanism includes a reaction-plate, said reaction-plate is configured to react to said acid;
   wherein said trigger mechanism includes a plate-support, said plate-support is configured to retain said reaction-plate in a static position;
   wherein said second-diameter is larger that said first-diameter;
   wherein a plurality of said at least one passage adapter are configured to connect in series;
   wherein said spring is configured to abut with said first-diameter of said at least one line adapter;
   wherein said reaction-plate is configured to be replaced in said inline acid detection apparatus when said reaction-plate has reacted with said acid; and
   wherein said inhibitor is nested inside of said at least one passage adapter.

17. A method of using an inline acid detection apparatus, the method comprising the steps of:
   providing an inline acid detection apparatus for inhibition in an HVAC system, the apparatus comprising: at least one line adapter, said at least one line adapter configured to mate with a refrigerant line on said HVAC system, said at least one line adapter having a first-diameter and a second-diameter; at least one passage adapter, said at least one passage adapter configured to couple to said second-diameter of said at least one line adapter, said at least one passage adapter allowing a process fluid to flow therethrough, an inhibitor, said inhibitor configured to stop said process fluid from passing through said inline acid detection apparatus, said inhibitor actuated by a trigger mechanism, said trigger mechanism is configured to be actuated by an acid, said inhibitor including a plunger which is configured to close off said first-diameter of said at least one line adapter, and wherein said inline acid detection apparatus is configured to prevent circulation of said process fluid within said HVAC system by impeding flow of said process fluid through said passage adapter with said inhibitor when said process fluid includes a threshold of said acid such that said trigger mechanism actuates said inhibitor;

attaching said inline acid detection apparatus to said refrigerant line in series to a compressor unit; and running an HVAC unit until said trigger mechanism causes said inhibitor to inhibit a process fluid flow through said inline acid detector apparatus.

18. The method of claim 17, further comprising the step of replacing a reaction-plate of said trigger mechanism.

\* \* \* \* \*